United States Patent [19]

Hiro

[11] Patent Number: 4,803,140

[45] Date of Patent: Feb. 7, 1989

[54] ELECTROPHOTOGRAPHIC PHOTOSENSITIVE MEMBER

[75] Inventor: Masaaki Hiro, Kanagawa, Japan

[73] Assignee: Canon Kabushiki Kaisha, Tokyo, Japan

[21] Appl. No.: 110,088

[22] Filed: Oct. 15, 1987

Related U.S. Application Data

[63] Continuation of Ser. No. 775,766, Sep. 18, 1985, abandoned.

[30] Foreign Application Priority Data

Sep. 20, 1984 [JP] Japan .................................. 59-195840

[51] Int. Cl.$^4$ ............................................... G03G 5/14
[52] U.S. Cl. ........................................ 430/58; 430/59; 430/96; 430/67
[58] Field of Search ......................... 430/57, 58, 67, 96

[56] References Cited

U.S. PATENT DOCUMENTS 3,928,034 12/1975 Regensburger ................... 430/58 X
4,030,921 6/1977 Akira et al. ............................ 430/96
4,335,195 6/1982 Nishigaki et al. ................. 430/96 X Primary Examiner—J. David Welsh
Attorney, Agent, or Firm—Fitzpatrick, Cella, Harper & Scinto

[57] ABSTRACT

An electrophotographic photosensitive member comprises a photosensitive layer on an electroconductive substrate, said photosensitive layer containing a polymer formed from a polymerizable monomer having, in the side chain, an aromatic ring substituted with fluorine atom as the constituent.

4 Claims, No Drawings

ELECTROPHOTOGRAPHIC PHOTOSENSITIVE MEMBER

This application is a continuation, of application Ser. No. 775,766 filed Sept. 13, 1985, now abandoned.

BACKGROUND OF THE INVENTION

1. Field of the Invention

This invention relates to an electrophotographic photosensitive member, more particularly, to an electrophotographic photosensitive member having durability which is excellent in humidity resistance and cleaning property.

2. Description of the Prior Art

As photoconductive materials for electrophotographic photosensitive members, there have been known inorganic photoconductive materials such as selenium, cadmium sulfide, zinc oxide and the like, and organic photoconductive materials such as polyvinyl carbazole, oxadiazole, phthalocyanine, and the like. Organic photoconductive materials, while they are excellent in productivity as compared with inorganic photoconductive materials, are lower in sensitivity. Accordingly, as an effective sensitization method, it is also known to use a constitution of function separation type in which a charge generation layer and a charge transport layer are laminated.

As a matter of course, an electrophotographic photosensitive member is required to be provided with sensitivity, electrical characteristics, and further optical characteristics corresponding to the electrophotographic process to be applied. Particularly, in a photosensitive member which can be used repeatedly, its surface layer is subjected directly with electrical and mechanical outer forces such as corona charging, toner development, transfer onto paper, cleaning treatment, and the like, and therefore, resistance to such treatments is required. More specifically, resistance to lowering in sensitivity or lowering in potential, increase of residual potential due to deterioration by ozone generated during corona charging, and generation of abrasion or flaws at the surface by friction is demanded. On the other hand, humidity resistance of a photosensitive member is also another important property. Even if a photosensitive member is provided with excellent electrophotographic characteristics under low humidity, stable and clear images can be obtained with difficulty, provided that the surface potential of the photosensitive member is markedly lowered under high humidity. Also, in an electrophotographic process in which transfer of image is conducted, since the photosensitive member is usually employed repeatedly, humidity resistance will frequently be lowered because of charging deterioration of the photosensitive member. Such lowering in humidity resistance may be prevented to some extent by heating the photosensitive member with a heater to remove moisture, but such a measure will result in increased cost, because the heater must be constantly actuated.

Further, attachment of paper powder through contact with paper may be a cause for image flow under high humidity. This may be considered as follows. While paper powder absorbs moisture in the air on one hand, the nitrogen oxide formed by corona discharging will be dissolved in the moisture thus absorbed to form ions which will lower the electrical resistance of the paper powder, whereby the portion attached with paper powder can bear charges with difficulty. Also, since the paper powder is caused to flow in the rotational or moving direction of the photosensitive member during the cleaning treatment, the portion bearing difficulty in bearing the charges will also be caused to flow, whereby blank areas bearing no toner due to difficulty in bearing charges will be generated in "flowed form". This is the image flow, and of course no image will be formed at the blank area. Also, the residual toner due to filming or cleaning badness of toner will impair markedly the images obtained. Accordingly, it has been demanded to form a photo-sensitive member surface which will hardly be contaminated or readily removed of contaminants, if contaminated.

In the prior art, various methods have been proposed to overcome the drawbacks as described above. As one method, it has been known to add by dispersing fine powder of a fluorine type polymer such as Teflon, polyvinylidene fluoride, etc. into the surface layer of a photosensitive member or cover a photosensitive layer with a resin layer in which these fine powders are dispersed. However, although considerable improved effect can be seen with respect to contamination prevention, humidity resistance, etc., it is not practical because there is observed a phenomenon that the residual potential is increased as the photosensitive member is used repeatedly to cause generation of fog in the image.

Also, it has been attempted to lower the coefficient of friction of the photosensitive member surface or impart humidity resistance to the photosensitive member surface by addition of a fluorine type or silicone type surfactant or oligomer into the surface layer of a photosensitive member. Its effect can be recognized fully at the initial stage, but as the photosensitive member is repeatedly used and the surface layer is scraped off mechanically by cleaning, etc., the effect will become extemely reduced.

Further, an example of using a polymer of a vinyl compound having fluorine atom in the side chain as a finder for a photoconductor so as to continue the effect is also known as disclosed in Japanese Patent Application Laid-open No. 37046/1977. However, such a polymer has generally a side chain of fluorine-substituted alkyl group and is therefore poor in compatibility with an organic photoconductive material, and also insufficient in mechanical strength, and it is difficult to produce a photosensitive member excellent in durability with the use of such a polymer.

SUMMARY OF THE INVENTION

Accordingly, an object of the present invention is to provide a photosensitive member excellent in cleaning property.

Another object of the present invention is to provide a photosensitive member which is free from occurrence of image flow.

Still another object of the present invention is to provide a photosensitive member excellent in mechanical strength.

Still another object of the present invention is to provide a photosensitive member which is excellent in compatibility with a photoconductive material, in particular a charge transport material and can form good images.

Still another object of the present invention is to provide a photosensitive member which is small in residual potential.

The electrophotographic photosensitive member of the present invention has a photosensitive layer on an electroconductive substrate, said photosensitive layer containing a polymer formed from a polymerizable monomer having, in the side chain, an aromatic ring substituted with fluorine atom as the constituent.

DESCRIPTION OF THE PREFERRED EMBODIMENTS

The polymer formed from a polymerizable monomer having an aromatic ring substituted with fluorine atom in the side chain as the constituent remarkably improves the surface lubricity of the photosensitive member by being contained in the photosensitive member, resulting in improvement of the cleaning property. Also, by improvement of the cleaning property, the surface of the photosensitive member can be prevented from attachment of paper powder, whereby image flow can also be prevented.

The polymer is also good in compatibility with a charge transport material. Since most of charge transport materials such as hydrazone compounds or pyrazoline compounds have aromatic rings in the molecule, and therefore can undergo interactions between the molecules and this polymer having similarly an aromatic ring. Further, since the aromatic ring is substituted with fluorine atoms, localization of electrons occurs due to electron attracting force of fluorine atoms, whereby interaction with the charge transport material can further be strengthened. For this reason, the polymer can be excellent in compatibility with the charge transport material to give excellent images. This polymer has also great mechanical strength because the polymer has aromatic rings, rigid structure, and the side chain is shorter than alkyl group containing many carbon atom, and therefore it will not impair mechanical durability of the photosensitive member even when contained therein.

The polymerizable monomer having an aromatic ring substituted with a fluorine atom in the side chain to be used in the present invention may preferably be the compounds represented by the following formulae:

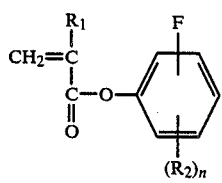 (I)

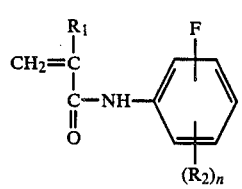 (II)

wherein $R_1$ represents hydrogen atom or methyl group; $R_2$ represents hydrogen atom, halogen atom, alkyl group, alkoxy group, nitrile group, or a combination thereof; and n represents an integer of 1 to 4.

Typical examples represented by the above formulae (I) and (II) are shown below:

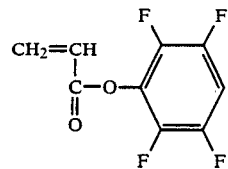 (1)

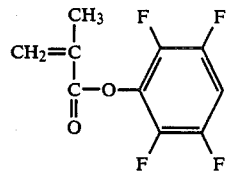 (2)

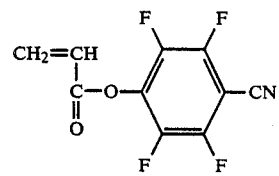 (3)

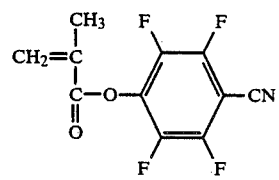 (4)

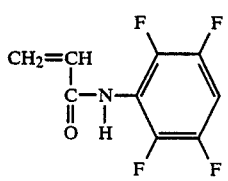 (5)

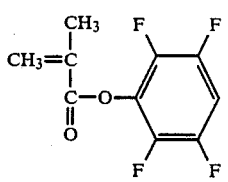 (6)

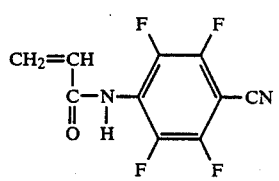 (7)

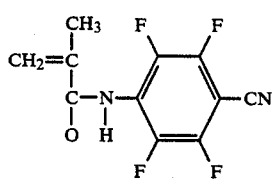 (8)

The polymer having, in the side chain, the polymerizable monomer having an aromatic ring substituted with fluorine atom to be used in the present invention can be obtained by homopolymerization or copolymerization of two or more kinds of polymerizable monomers having an aromatic ring substituted with fluorine atom in the side chain, or further by copolymerization of at least one polymerizable monomer having an aromatic ring substituted with fluorine atom in the side chain with other vinyl compounds.

As the polymerization method, there may be employed radical polymerization or ion polymerization such as solution polymerization, suspension polymerization, bulk polymerization, and the like, but radical polymerization by way of solution polymerization is simple and preferred.

Other vinyl compounds to be copolymerized may be any compound copolymerizable with the polymerizable monomer having an aromatic ring substituted with fluorine atom in the side chain, particularly preferably methacrylates, acrylates and styrene compounds.

The content of the recurring units based on the polymerizable monomer having an aromatic ring substituted with fluorine atom in the side chain in this copolymer may be 5 wt. % or more, preferably 10 wt. % to 50 wt. %.

The molecular weight of the polymer obtained should preferably be 10,000 to 1,000,000, particularly 100,000 to 600,000, in terms of the weight average molecular weight Mw.

In the preparation of the electrophotographic photosensitive member of the present invention, the substrate to be employed may be a cylinder or film of a metal such as of aluminum, stainless steel, and the like, a paper or a plastic. On the substrate, it is also possible to provide a subbing layer (adhesive layer) having a barrier function and a subbing function, if desired.

The subbing layer is formed for the purpose of improving adhesiveness, improving coatability, protecting the substrate, covering defects on the substrate, improving charge injectability from the substrate, protecting the photosensitive layer against electrical destruction, etc. As the material for subbing layer, there have been known polyvinyl alcohol, poly-N-vinylimidazole, polyethylene oxide, ethyl cellulose, methyl cellulose, ethyleneacrylic acid copolymer, casein, polyamide, copolymeric nylon, glue, gelatin, etc. These can be coated on the substrate as solutions dissolved in solvents appropriate for respective materials. The film thickness may be about 0.2 to 2μ.

As the photoconductive material contained in the photosensitive layer, there may be included, as inorganic photoconductive materials, oxides, sulfides, iodides, selenides, etc. of metals such as Zn, Hg, Al, Sb, Bi, Cd, Mo, etc., such as zinc oxide, selenium, cadmium sulfide, zinc sulfide, cadmium selenide, lead oxide, arsenic sulfide, titanium oxide, zinc titanium oxide, zinc silicon oxide, zinc magnesium oxide, mercury iodide, mercury oxide, mercury sulfide, indium sulfide, calcium strontium sulfide, etc. Also, as organic photoconductive materials, there may be included vinyl carbazole, anthracene, phthalocyanine, trinitrofluorenone, polyvinyl carbazole, polyvinyl anthracene, polyvinyl pyrene, etc., and a sensitizing dye or a Lewis acid may be added, if desired.

For formation of a photosensitive layer, a binder may be used, if desired.

As the binder, there may be used various kinds of insulating resins conventionally employed. For example, there may be included polyethylene, polyester, polypropylene, polystyrene, polyvinyl chloride, polyvinyl acetate, acrylic resin, polycarbonate, silicone resin, epoxy resin, etc.

In the function separation type photosensitive member, as the charge generation substance, there may be employed selenium-tellurium, pyrylium, thiopyrilium type dye, phthalocyanine type pigment, anthoanthrone pigment, dibenzpyrenequinone pigment, pyranthrone pigment, trisazo pigment, disazo pigment, azo pigment, indigo pigment, quinacridone pigment, non-symmetric quinocyanine, quinocyanine or amorphous silicon as disclosed in Japanese Patent Application Laid-open No. 143645/1979. As the charge transport substance, there may be employed, pyrene, N-ethylcarbazole, N-isopropylcarbazole, N-methyl-N-phenylhydrazine-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazine-3-methylidene-10-ethylphenoxazine, P-diethylaminobenzaldehyde; hydrazones such as N,N-diphenylhydrazone, P-diethylaminobenzaldehyde-N-α-naphthyl-N-phenylhydrazone, P-pyrrolidinobenzaldehyde-N,N-diphenylhydrazone, 1,3,3-trimethylindolenine-ω-aldehyde-N,N-diphenylhydrazone, P-diethylbenzaldehyde-3-methylbenzthiazolinone-2-hydrazone, etc.; 2,5-bis(P-diethyl-aminophenyl)-1,3,4-oxadiazole; pyrazolines such as 1-phenyl-3-(P-diethylaminostyryl)-5-(P-diethylaminophenyl)-pyrazoline, 1-(quinonyl(2))-3-(P-diethylaminostyryl)-5-(P-diethylaminophenyl)pyrazoline, 1-(pyridyl(2))-3-(P-diethylaminostyryl)-5-(P-diethylaminophenyl)pyrazoline, 1-(6-methoxy-pyridyl(2))-3-(P-diethylaminostyryl)-5-(P-diethylaminophenyl)pyrazoline, 1-(pyridyl(3))-3-(P-diethylaminostyryl)-5-(P-diethylaminophenyl)-pyrazoline, 1-(lepidyl(2))-3-(P-diethylaminostyryl)-5-(P-diethylaminophenyl)pyrazoline, 1-(pyridyl(2))-3-(P-diethylaminostyryl)-4-methyl-5-(P-diethylaminophenyl)pyrazoline, 1-(pyridyl(2))-3-(α-methyl-P-diethylaminostyryl)-5-(P-diethylaminophenyl)pyrazoline, 1-phenyl-3-(P-diethylaminostyryl)-4-methyl-5-(P-diethylaminophenyl)pyrazoline, 1-phenyl-3-(α-benzyl-P-diethylaminostyryl)-5-(P-diethylaminophenyl)pyrazoline, spiropyrazoline, etc.; oxazole compounds such as 2-(P-diethylaminostyryl)-6-diethylaminobenzoxazole, 2-(P-diethylaminophenyl)-4-(P-diethylaminophenyl)-5-(2-chlorophenyl)oxazole, etc.; thiazole compounds such as 2-(P-diethylaminostyryl)-6-diethylaminobenzothiazole, etc.; triarylmethane compounds such as bis(4-diethylamino-2-methylphenyl)-phenylmethane, etc.; polyarylkanes such as 1,1-bis(4,N,N-diethylamino-2-methylphenyl)heptane, 1,1,2,2-tetrakis-(4-N,N-diethylamino-2-methylphenyl)ethane, etc.

The charge generation layer may be formed by dispersing well the pigment for charge generation as mentioned above together with 0.3 to 4-fold as much as a binder resin and a solvent according to the method by use of homogenizer, ultrasonic wave, bass mill, vibrating ball, mill, sand mill, attritor, roll mill, etc., followed by coating and drying. Its thickness may be about 0.1 to 1μ.

The charge transport layer may be formed by dissolving the charge transport substance and the polymer of the present invention as the binder in a solvent, and applying the solution on the charge generation layer. The mixing ratio of the charge transport substance to the binder resin of the present invention may be about 2:1 to 1:2. As the solvent, there may be employed ketones such as acetone, methyl ethyl ketone, etc., esters such as methyl acetate, ethyl acetate, etc., aromatic hydrocarbons such as toluene, xylene, etc., chlorine type hydrocarbons such as chlorobenzene, chloroform, carbon tetrachloride, etc. In coating of this solution, there may be employed, for example, the dip coating method, the spray coating method, the spinner coating method, the bead coating method, the blade coating method, the curain coating method, etc. Drying may be carried out under air atream or stationarily at a temperature of 10° to 200° C., preferably 20° to 150° C., for 5 minutes to 5 hours, preferably 10 minutes to 2 hours. The film thickness of the charge transport layer formed may appropriately be 5 to 20μ.

In the photosensitive layer, the charge generation layer and the charge transport layer, in addition to the polymer or copolymer of the present invention having a polymerizable monomer having an aromatic ring substituted with fluorine atom in the side chain as the constituent, other resins may be incorporated, and in such a case, the content of the constituent of the polymerizable monomer having an aromatic ring substituted with fluorine atom in the side chain may suitably be 5 wt. % or more.

The charge transport layer of the present invention can contain various additives. Such additives may include diphenyl, diphenyl chloride, p-terphenyl, p-terphenyl, dibutyl phthalate, dimethylglycol phthalate, dioctyl phthalate, triphenyl phosphoric acid, methyl naphthalene, benzophenone, chlorinated paraffin, dilauryl thiopropionate, 3,5-dinitrosalicylic acid, etc.

The electrophotographic photosensitive member of the present invention can be utilized not only for an electrophotographic copying machine but also widely for electrophotographic fields of application such as laser printing, CRT printer, electrophotographic printing system, etc.

The present invention is described by referring to the Examples.

EXAMPLE 1

Ten parts (by weight, hereinafter the same) of lactic casein was weighed, dispersed in 90 parts of water, and then dissolved with addition of 1 part of aqueous ammonia. On the other hand, 3 parts of a hydroxypropylmethyl cellulose resin (tradename: Metrose 60SH50, produced by Shinetsu Kagaku K.K.) were dissolved in 20 parts of water, and both of the solutions were then mixed to prepare a coating solution for subbing layer.

The solution was applied on an aluminum cylinder of 80φ×300 mm according to the dipping method, followed by drying at 80° C. for 10 minutes, to form a subbing layer with a thickness of 10μ.

Next, 10 parts of a bisazo pigment of the formula:

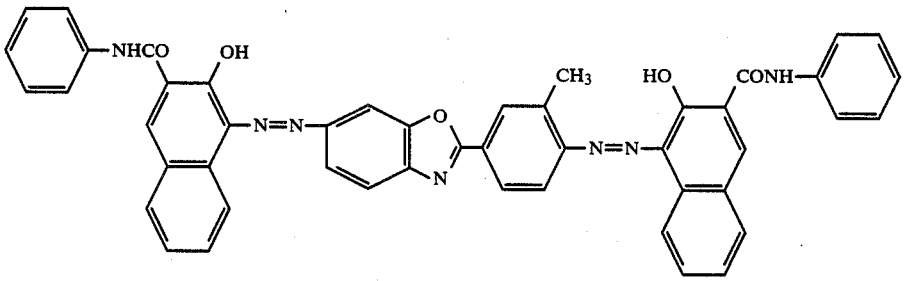

8 parts of a polyvinyl butyral resin (trade name: S-LEC BXL, produced by Sekisui Kagaku K.K.) and 60 parts of cyclohexanone were dispersed by means of a sand mill device with the use of 1φ glass beads for 20 hours. Into the dispersion were added 100 parts of methyl ethyl ketone, and the resultant mixture was applied by dipping on the above subbing layer, followed by drying at 100° C. for 5 minutes to form a charge generation layer with a thickness of 0.15μ.

To the charge generation layer was applied according to the dipping method a solution of 7 parts of a hydrazone compound of the formula:

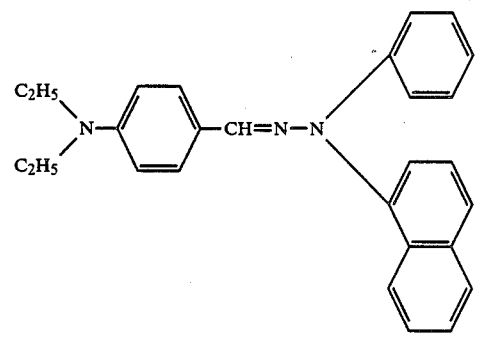

and 10 parts of a copolymer of methyl methacrylate-2,3,5,6-tetrafluorophenyl methacrylate copolymer (copolymer ratio: methyl methacrylate-2,3,5,6-tetrafluorophenyl methacrylate=80/20 weight ratio, molecular weight Mw=280,000) dissolved in monochlorobenzene, followed by drying in hot air at 110° C. for 60 minutes, to form a charge transport layer with a thickness of 18μ.

The photosensitive drum thus prepared was subjected to successive copying test by means of an electrophotographic copying machine provided with a −5.6 KV corona discharger, an exposure optical system having an exposure dosage of 15 lux·sec, a developer, a transfer charger, a discharging exposure optical system and a cleaner, under the environmental conditions of a temperature of 23° C. and a humidity of 60%, and a temperature of 33° C. and a humidity of 90%, and the changes in potential at the dark portion ($V_D$) and at the light portion ($V_L$) with lapse of time were measured. Also, successive copying test of continuous image formation was conducted for 3,000 sheets under the environment of a temperature of 33° C. and a humidity of 90%, and the number of successive sheets of copying before occurrence of "image flow" was measured. The results are shown in Table 1 (infra).

EXAMPLE 2

A photosensitive member was prepared in the same manner as in Example 1 except for using a methyl methacrylate-4-cyano-2,3,5,6-tetrafluorophenyl methacrylate copolymer (copolymer ratio: methyl methacrylate/4-cyano-2,3,5,6-tetrafluorophenyl methacrylate=80/20 weight ratio, molecular weight Nw=250,000) in place of the methyl methacrylate- 2,3,5,6-tetrafluorophenyl methacrylate copolymer in Example 1. The photosensitive drum thus prepared was subjected to the successive copying test according to the same method as in Example 1. The results are shown in Table 1.

COMPARATIVE EXAMPLE 1

A photosensitive member was prepared and evaluated in the same manner as in Example 1, except for using a polymethyl methacrylate (tradename: Dianal BR-85: produced by Mitsubishi Rayon K.K.) in place of the methyl methacrylate-2,3,5,6-tetrafluorophenyl methacrylate in Example 1. The results are shown in Table 1.

COMPARATIVE EXAMPLE 2

A photosensitive member was prepared in the same manner as in Example 1, except for using a methyl methacrylate-trifluoroethyl methacrylate copolymer (copolymer ratio: methyl methacrylate/trifluoroethyl methacrylate=80/20 weight ratio, molecular weight Mw=290,000). However, due to poor compatibility of the above copolymer with the hydrazone compound, the hydrazone compound was precipitated on the charge transport layer formed. Further, when image was formed by means of the electrophotographic copying machine as described in Example 1, a large number of black dots were observed on the image.

EXAMPLE 3

According to the same procedure as in Example 1, except for using a styrene-2,3,5,6-tetrafluorophenyl methacrylate copolymer (copolymer ratio: styrene/2,3,5,6-tetrafluorophenyl methacrylate=70/30 weight ratio, molecular weight Mw=210,000) in place of the methyl methacrylate-2,3,5,6-tetrafluorophenyl methacrylate copolymer in Example 1, a photosensitive member was prepared. Further, the photosensitive drum was subjected to successive copying test similarly as in Example 1 to obtain the results as shown in Table 1.

EXAMPLE 4

According to the same procedure as in Example 3, except for using a styrene-4-cyano-2,3,5,6-tetrafluorophenyl acrylate copolymer (copolymer ratio: styrene/4-cyano-2,3,5,6-tetrafluorophenyl acrylate=85/15 weight ratio, molecular weight Mw=220,000) in place of the styrene-2,3,5,6-tetrafluorophenyl methacrylate copolymer in Example 3, a photosensitive member was prepared. Further, the photosensitive drum was subjected to successive copying test similarly as in Example 1 to obtain the results as shown in Table 1.

COMPARATIVE EXAMPLE 3

A photosensitive member was prepared and evaluated in the same manner as in Example 3 except for using a polystyrene (tradename: HF-55, produced by Mitsubishi Monsanto K.K.) in place of the styrene-2,3,5,6-tetrafluorophenyl methacrylate in Example 3. The results are shown in Table 1.

In the above Table 1, "—" shows that no data of successive copying of 3,000 sheets was obtained because toner fusion occurred on the photosensitive member, whereby no image formation could be effected.

TABLE 1

| Example or Comparative example | Environment | | | | | | | | Image characteristic Image flow (sheets) |
|---|---|---|---|---|---|---|---|---|---|
| | 23° C., 60% RH | | | | 33° C., 90% RH | | | | |
| | Evaluation item | | | | | | | | |
| | Potential characteristics | | | | Potential characteristics | | | | |
| | Initial stage | | After successive copying of 3000 sheets | | Initial stage | | After successive copying of 3000 sheets | | |
| | $V_D(V)$ | $V_L(V)$ | $V_D(V)$ | $V_L(V)$ | $V_D(V)$ | $V_L(V)$ | $V_D(V)$ | $V_L(V)$ | |
| Example 1 | −545 | −60 | −555 | −65 | −540 | −55 | −550 | −65 | not generated |
| Example 2 | −555 | −55 | −560 | −70 | −550 | −55 | −540 | −60 | not generated |
| Comparative example 1 | −550 | −60 | −565 | −85 | −540 | −50 | −535 | −80 | at 950th sheets |
| Example 3 | −540 | −50 | −545 | −60 | −535 | −50 | −550 | −65 | not generated |
| Example 4 | −560 | −55 | −565 | −65 | −550 | −50 | −570 | −60 | not generated |
| Comparative example 3 | −555 | −50 | — | — | −550 | −45 | — | — | image contamination due to fusion of toner generated at 700th sheets |

EXAMPLE 5

Seven parts of the hydrazone compound in Example 1 and 10 parts of methyl methacrylate (trade nade: Dianal BR-85, produced by Mitsubishi Rayon K.K.) were dissolved in 60 parts of monochlorobenzene, and the solution was applied according to the dipping method on the aluminum cylinder having formed a subbing layer thereon similarly as in Example 1, followed by drying at 100° C. for 20 minutes, to form a charge transport layer of 15μ thick.

Next, 5 parts of the bisazo pigment in Example 1, 15 parts of a methyl methacrylate-2,3,5,6-tetrafluorophenyl methacrylate copolymer (copolymer ratio: methyl methacrylate/2,3,5,6-tetrafluorophenyl methacrylate=70/30 weight ratio, molecular weight Mw=250,000) and 100 parts of monochlorobenzene were dispersed by means of a sand mill device with the use of 1 mm φ glass beads for 20 hours. The dispersion was spray-coated on the above charge transport layer, and dried at 100° C. for 30 minutes to form a charge generation layer of 5μ thick.

The photosensitive drum thus prepared was subjected to evaluation of electrophotographic characteristics and images under the same environmental conditions as in Example 1 by means of an electrophotographic copying machine provided with a corona charger of +5.6 KV, an exposure optical system having an exposure dosage of 15 lux·sec., a developer, a transfer charger, a discharging exposure optical system and a cleaner. The results are shown in Table 2. After successive copying of images, no flaw was observed on the drum surface, and no image contamination such as black dot, etc. was generated.

COMPARATIVE EXAMPLE 4

A photosensitive member was prepared in the same manner as in Example 5 except for using a methyl methacrylate/heptadecafluorononyl methacrylate copolymer (copolymer ratio: methyl methacrylate-heptadecafluorononyl methacrylate=70/30, molecular weight Mw=200,000) in place of methyl methacrylate/2,3,5,6-tetrafluorophenyl methacrylate copolymer in Example 5. The photosensitive drum thus prepared was evaluated for electrophotographic characteristics and images under the same condition as in Example 5. In successive copying of images, flaws began to be generated on the drum after some hundred sheets of copying, and a large number of black dots formed as the result of fusion of toner onto the flaws were observed on the images after about 1000 sheets of copying.

EXAMPLE 6

On an aluminum cylinder having formed the subbing layer similarly as In Example 1, a dispersion formed by a ball mill of 0.5 parts of ε-copper phthalocyanine pigment, 9.5 parts of a binder resin of a methyl methacrylate/2,3,5,6-tetrafluorophenyl methacrylate copolymer (copolymer ratio: methyl methacrylate/2,3,5,6-tetrafluorophenyl methacrylate=70/30, molecular weight Mw=250,000) and 45 parts of monochlorobenzene was applied according to the dipping method, and dried at 100° C. for one hour to form a photoconductive layer of 15μ thick.

The photosensitive drum thus prepared was evaluated for electrophotographic characteristics and images under the same environmental conditions as in Example 1 to obtain the results as shown in Table 2.

2. An electrophotographic photosensitive member according to claim 1, wherein said fluorine atom containing polymer contains a monomer selected from the polymerizable monomers shown by the formulae (I) and (II) shown below:

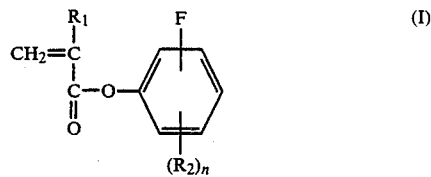

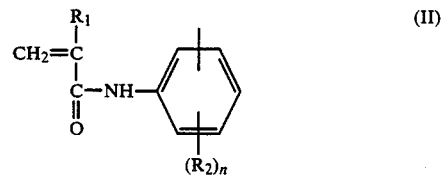

wherein $R_1$ represents hydrogen atom or methyl group; $R_2$ represents hydrogen atom, halogen atom, alkyl group, alkoxy group, nitrile group or a combination thereof; and n represents an integer of 1 to 4.

3. An electrophotographic photosensitive member according to claim 1, wherein said fluorine atom containing polymer contains 5 wt. % or more of the polymerizable monomer having, in the side chain, the aromatic ring substituted with fluorine atom.

4. An electrophotographic photosensitive member having a photosensitive layer on an electroconductive substrate, said photosensitive layer having a laminated structure comprising a charge generation layer containing an organic photoconductive charge generation material and a charge transport layer containing a hydrazone as an organic charge transport material; wherein said charge transport layer or said charge generation

TABLE 2

| | Environment | | | | | | | |
|---|---|---|---|---|---|---|---|---|
| | 23° C., 60% RH | | | | 33° C., 90% RH | | | |
| | Evaluation item | | | | | | | |
| | Potential characteristics | | | | Potential characteristics | | | |
| Example or Comparative example | Initial stage | | After successive copying of 3000 sheets | | Initial stage | | After successive copying of 3000 sheets | Image characteristic Image flow |
| | $V_D(V)$ | $V_L(V)$ | $V_D(V)$ | $V_L(V)$ | $V_D(V)$ | $V_L(V)$ | $V_D(V)$ | $V_L(V)$ | (sheet) |
| Example 5 | 550 | 150 | 560 | 180 | 540 | 135 | 560 | 180 | not generated |
| Comparative example 4 | 540 | 190 | 560 | 240 | 555 | 205 | — | — | Image contamination due to fusion of toner generated at 1,000th sheet |
| Example 6 | −560 | −220 | −580 | −230 | −570 | −205 | −580 | −240 | Not generated |

I claim:

1. An electrophotographic photosensitive member having a photosensitive layer on an electroconductive substrate, said photosensitive layer having a laminated structure comprising a charge generation layer containing an organic photoconductive charge generation material and a charge transport layer containing an organic charge transport material having aromatic rings in the molecule, said charge transport layer being coated on the charge generation layer said charge transport layer containing a polymer formed from a polymerizable monomer having, in the side chain, an aromatic ring substituted with fluorine atom as the constituent.

layer additionally contains a fluorine atom containing a polymer formed from a polymerizable monomer of Formulae (I) or (II) shown below:

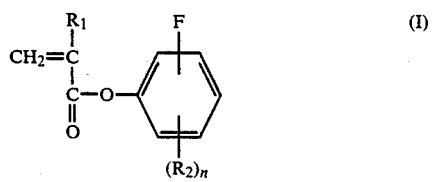

-continued
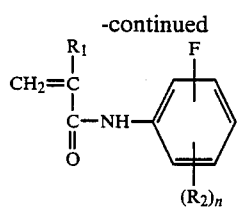
(II)
wherein $R_1$ represents hydrogen atom or methyl group; $R_2$ represents hydrogen atom, halogen atom, alkyl group, alkoxy group, nitrile group or a combination thereof; and n represents an integer of 1 to 4.
* * * * *

UNITED STATES PATENT AND TRADEMARK OFFICE
CERTIFICATE OF CORRECTION

PATENT NO. : 4,803,140
DATED : February 7, 1989
INVENTOR(S) : MASAAKI HIRO

It is certified that error appears in the above-identified patent and that said Letters Patent is hereby corrected as shown below:

COLUMN 1

Line 5, "continuation," should read --continuation--.

COLUMN 2

Line 12, "photo-sensitive" should read --photosensitive--.
    Line 40, "finder" should read --binder--.
    Line 67, "small" should read --low--.

COLUMN 3

Line 38, "atom," should read --atoms,--.

COLUMN 6

Line 51, "bass mill," should read --ball mill,--.
    Line 52, "ball, mill," should read --ball mill,--.

COLUMN 7

Line 2, "curain" should read --curtain--.
    Line 3, "atream" should read --stream--.
    Line 20, "p-terphenyl," should read --o-terphenyl,--.
    Line 65, "1$\phi$ glass beads" should read --1mm glass beads--.

UNITED STATES PATENT AND TRADEMARK OFFICE
CERTIFICATE OF CORRECTION

PATENT NO. : 4,803,140
DATED : February 7, 1989
INVENTOR(S) : MASAAKI HIRO

It is certified that error appears in the above-identified patent and that said Letters Patent is hereby corrected as shown below:

COLUMN 8

Line 68, "Nw=250,000)" should read --Mw=250,000)--.

COLUMN 10

Line 14, "the above Table 1," should read
--Table 1,--.

COLUMN 11

Line 25, "In" should read --in--.
Line 65, "layer said" should read --layer, said--.

COLUMN 12

Line 3, "contains" should read --is formed from--.
Line 28, "of the" should read --of recurring units based on the--.

UNITED STATES PATENT AND TRADEMARK OFFICE
CERTIFICATE OF CORRECTION

PATENT NO. : 4,803,140
DATED : February 7, 1989
INVENTOR(S) : MASAAKI HIRO

It is certified that error appears in the above-identified patent and that said Letters Patent is hereby corrected as shown below:

COLUMN 12

Lines 14-20, "
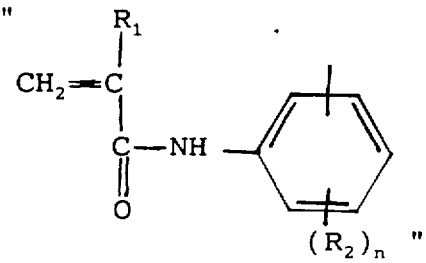
"

should read
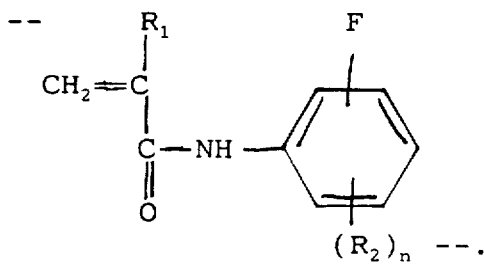
--.

Signed and Sealed this

Tenth Day of October, 1989

Attest:

DONALD J. QUIGG

Attesting Officer

Commissioner of Patents and Trademarks